United States Patent [19]

Mechin et al.

[11] Patent Number: 5,232,334

[45] Date of Patent: Aug. 3, 1993

[54] ROTARY MACHINE HAVING AN AXIAL ABUTMENT THAT RETRACTS AUTOMATICALLY BY MEANS OF A FLEXIBLE MEMBRANE SUBJECTED TO THE PRESSURE OF A FLUID

[75] Inventors: Claude Mechin, St Marcel; Luc Chatenet, Vernon, both of France

[73] Assignee: Societe Europeenne de Propulsion, Suresnes, France

[21] Appl. No.: 784,366

[22] Filed: Oct. 29, 1991

[30] Foreign Application Priority Data

Oct. 31, 1990 [FR] France .................. 90 13572

[51] Int. Cl.$^5$ .............................................. F01D 11/00
[52] U.S. Cl. ...................... 415/113; 384/102; 384/610; 384/616; 384/517
[58] Field of Search .............. 415/111, 113, 140; 384/101, 102, 243, 244, 245, 493, 504, 517, 556, 557, 610, 616, 617

[56] References Cited

U.S. PATENT DOCUMENTS

| 3,097,023 | 7/1963 | Nojima | 415/111 X |
|---|---|---|---|
| 3,360,310 | 12/1967 | Hiatt et al. | 384/102 |
| 3,558,199 | 1/1971 | Raiser et al. | 384/556 |
| 3,642,331 | 2/1972 | Silver | 384/102 |
| 3,698,251 | 10/1972 | Silvia | 74/5 |
| 3,708,215 | 1/1973 | Wilcock et al. | 384/102 |
| 4,411,479 | 10/1983 | Hirata et al. | 384/504 |
| 4,808,091 | 2/1989 | Ruetz | 384/556 X |
| 4,865,529 | 9/1989 | Sutton et al. | 417/409 |
| 4,989,436 | 2/1991 | Setzer et al. | 384/556 X |
| 5,076,755 | 12/1991 | Okada | 415/111 X |

FOREIGN PATENT DOCUMENTS

| 827276 | 1/1952 | Fed. Rep. of Germany | 384/517 |
|---|---|---|---|
| 442026 | 11/1948 | Italy | 415/113 |
| 1525334 | 11/1989 | U.S.S.R. | 415/113 |
| 13784 | of 1851 | United Kingdom | 384/243 |
| 472742 | 9/1937 | United Kingdom | 384/517 |
| 558576 | 1/1944 | United Kingdom | 415/113 |

OTHER PUBLICATIONS

Patent Abstracts of Japan, vol. 9, No. 194 (M-403) [1917], Aug. 10, 1985; and JP-A-60 60 324 (NTN Toyo Bearing K.K.) Jun. 4, 1985.

Primary Examiner—Edward K. Look
Assistant Examiner—Todd Mattingly
Attorney, Agent, or Firm—Weingarten, Schurgin, Gagnebin & Hayes

[57] ABSTRACT

The rotary machine includes an automatically-retracting axial abutment system mounted between the rotary shaft of the machine and its case, the abutment system having a displaceable abutment portion that is prevented from rotating, a rotary abutment portion mounted on the displaceable abutment portion by means of a bearing suitable for transmitting axial forces to the displaceable abutment portion, a very stiff flexible device connecting the displaceable abutment portion to the case in such a manner as to enable the displaceable abutment portion to move through a small amplitude in translation along the axis of the rotary shaft, and an axial thrust transmission member for transmitting thrust from the rotary shaft to the rotary abutment portion, the thrust transmission member being shaped to be in contact between the rotary shaft and the displaceable abutment portion when the machine is at rest, and to drive the rotary abutment portion via purely static friction when the machine is rotating and is exerting axial thrust. Means enable a control fluid to be applied in contact with the flexible device so that the pressure of the fluid exerts a force on the flexible device tending to move the displaceable abutment portion, the rotary abutment portion, and, where applicable, the thrust transmission member away from the shaft when the pressure of the fluid conveyed by the machine at a given point within the machine exceeds a predetermined value.

19 Claims, 8 Drawing Sheets

ROTARY MACHINE HAVING AN AXIAL ABUTMENT THAT RETRACTS AUTOMATICALLY BY MEANS OF A FLEXIBLE MEMBRANE SUBJECTED TO THE PRESSURE OF A FLUID

FIELD OF THE INVENTION

The present invention relates to a rotary machine conveying a fluid, the machine comprising a rotary shaft mounted via radial bearings to a frame inside a case, and the shaft delivering axial thrust in a predetermined direction during the transient stages of starting and stopping, the pressure PR of the fluid at full speed at a given point in the machine being greater than the pressure value PL at which axial thrust disappears at the end of the transient starting stage or before the beginning of the transient stopping stage.

The invention thus relates to rotary machines engaged in fluid circuits, regardless of whether the machines are driving machines such as centrifugal pumps, or driven machines, i.e. machines producing torque.

In operation, some machines deliver axial thrust. This thrust is usually absorbed by a passive abutment, such as a ball abutment or a ball bearing having deep grooves. When very high performance machines are required, in particular machines operating at very high power per unit mass, which implies high speed and high pressure, these axial thrusts are so great that active axial balancing is necessary. It is provided by devices such as a balancing plate or a counterpump on centrifugal pumps.

However, such devices are effective only when the speed and pressure associated therewith exceed a predetermined fraction of the nominal speed. During starting and stopping, an additional axial balancing system needs to be provided.

Other axial machines are of a design such that at nominal speed and pressure they do not present any axial thrust. However, they may present such thrust during starting and stopping, thereby also requiring an additional axial balancing system for those periods.

It should also be mentioned that the efficiency of such machines depends heavily on the axial operating clearance provided for the various components carried by the rotor, and consequently on the axial play of the rotor, which play therefore needs to be reduced to a minimum, in particular for space applications.

PRIOR ART

Servo-controlled magnetic axial abutments are already implemented in rotary machines to ensure accurate agreement between thrust and counterthrust while maintaining the rotary shaft in a constant axial position to a high degree of accuracy. However, implementing such servo-controlled magnetic axial abutments requires considerable mass and volume both for the abutments and for the power supply, and as a result such an axial abutment system is not applicable to all types of rotary machine.

Axial abutments are also known that are fixed relative to the case and to the rotary shaft, with such abutments being made using ball bearings having deep grooves, for example. Such axial abutment systems are unsuitable for very high speeds of rotation and for very high efficiencies such as those required in the space industry.

In a high pressure turbopump designed for the space shuttle main engine (SSME), Pratt & Whitney have proposed implementing an independently fed hydrostatic abutment that operates only on starting and stopping. That system suffers from the drawback of acting on the axial clearance of the pump, thus requiring the abutment hydrostatic pressure to be servo-controlled in fairly complex manner to the axial position of the shaft. In addition, components external to the machine are required in all cases.

In the same context of a high pressure turbopump, Rockwell International Corporation has proposed using a ball abutment that absorbs axial thrust on starting and on stopping. In such a system, an axial balancing device takes effect when the speed exceeds a predetermined fraction of the nominal speed. The two tracks of the abutment move apart so that the balls are left "floating" between the two tracks.

In spite of its simplicity, that system suffers from the drawback of requiring axial clearances that are compatible with two axial positions of the shaft. These clearances apply, in particular, to the ball bearings, to the sealing rings, and to the impeller if it is a centrifugal pump. That system thus requires sets of accurately designed dimensions and very great accuracy in manufacture if high efficiency is to be obtained.

Such an axial abutment system having balls that retract under the action of the working fluid of the rotary machine, is designed by Rockwell International Corporation and is described in document U.S. Pat. No. 4,865,529 and is briefly discussed below with reference to FIG. 14.

Figure 14:
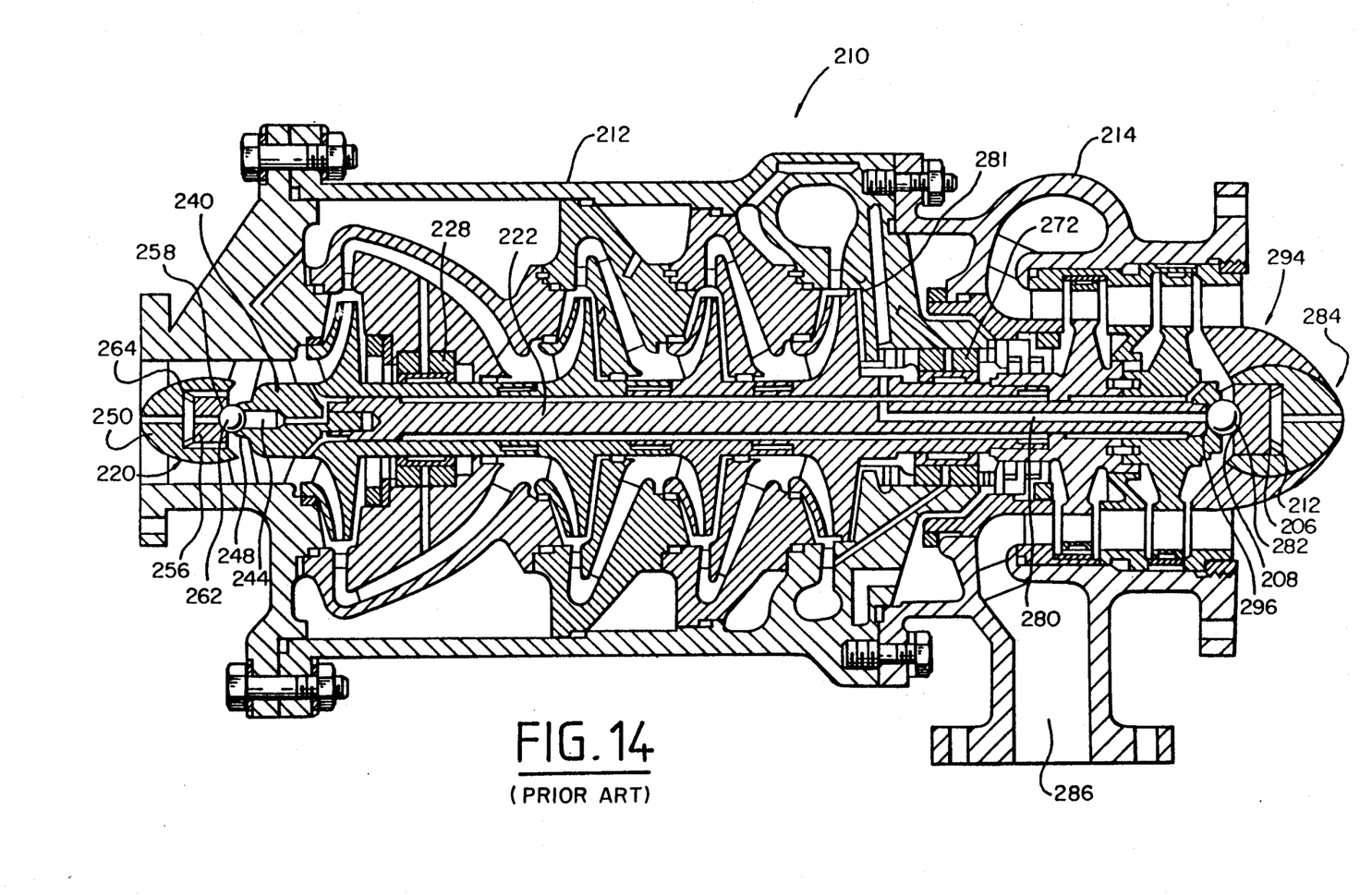
FIG. 14 is an axial section view through a rotary machine conveying a fluid and fitted with a prior art axial abutment system.

FIG. 14 shows a turbopump 210 comprising a front portion 212 constituting a pump and a rear portion 214 constituting a turbine. A central shaft 222 passes through the entire turbopump and co-operates with axial abutment systems 220 and 284 having balls 262 and 282 at its front and rear ends, which abutment systems act during stopping and starting to transmit thrust and support the shaft 222, whereas during nominal operation the shaft is supported by radial fluid bearings 228 and 272. Each axial abutment 220, 284 comprises a fixed piece 250, 294 axially receiving a ball support piece 256, 206 which is biased by a spring 264, 212 of the spring washer type and which has a hemispherical bearing surface 258, 208 for receiving a respective one of the balls 262, 282, which balls come into contact with another hemispherical surface 248, 296 formed at the end of the rotary shaft while the shaft is starting or stopping. Under nominal conditions, the ball support pieces 256, 206 are subjected to slight axial displacement against the action of the springs 264, 212, thereby retracting the balls 262, 282 which are then no longer in contact with the hemispherical bearing surfaces 248, 296 formed at the ends of the shaft 222. The ball supports 256, 206 retract under the combined effect of fluid applied to the inside of the shaft 222 via channels 244, 280, of a balancing piston 281 which displaces the rotary shaft 222 axially away from the ball 202 of the front axial abutment, and to a very small extent of the pressure of the expanding turbine gas exerted on the ball support piece 206 situated at the rear end.

In such a prior axial abutment system that is retractable under drive from the pressure of a fluid, the friction at the thrust transmission members constituted by the balls 262, 282 is high insofar as these balls are secured neither to the shaft 222 nor to the support piece 256 or 202, but are interposed between a rotary member 222 and a piece 256 or 206 which does not rotate. The use of springs such as spring washers 264, 212 greatly increases friction and prevents spring stiffness being adjusted smoothly, such that the forces obtained cannot be determined accurately. Nor can the action of the cooling fluid pressure on the balls 262 and 282 via the channels 244, 280 be adjusted over a wide range of values since the pressure at the inlet to the front channel 244 is equal to the pressure produced by the impeller 240, the pressure at the inlet to the rear channel 280 is equal to the delivery pressure, and the cross-sections of the channels 244 and 280 are small, such that the retracting action of the abutments must be driven essentially under the action of the balancing piston. Nevertheless, the existence of an internal leak recycled to the front by the channel 244 and of a leak to the turbine at the rear via the channel 280 contribute to reducing efficiency, and the set of axial dimensions for the various components of the turbopump requires difficult calculations and a high degree of manufacturing accuracy.

SUMMARY OF THE INVENTION

An object of the invention is to remedy the above-mentioned drawbacks and to enable an axial abutment system in a rotary machine on a fluid circuit to be retracted efficiently and simply except during starting and stopping during which axial thrust is generated, with the axial abutment system being retracted automatically once a predetermined fraction of the nominal pressure, and thus of the nominal speed is exceeded.

The invention also seeks to provide a rotary machine conveying a fluid in which friction and both the operating time and the drive speed of an axial abutment system are reduced to a minimum so as to increase the longevity of the axial abutment system without affecting the operation and the efficiency of the machine.

Another object of the invention consists in providing a rotary machine fitted with an axial abutment system capable of compensating axial thrust over a wide range of values, including high values.

These objects are achieved by a rotary machine conveying a fluid, the machine comprising a rotary shaft mounted via radial bearings to a frame inside a case, and the shaft delivering axial thrust in a predetermined direction during the transient stages of starting and stopping, the pressure PR of the fluid at full speed at a given point in the machine being greater than the pressure value PL at which axial thrust disappears at the end of the transient starting stage or before the beginning of the transient stopping stage, the machine being characterized in that it further comprises an automatically-retracting axial abutment system mounted between its rotary shaft and its case, said automatically-retracting axial abutment system comprising a displaceable abutment portion that is symmetrical about the axis of rotation of the rotary shaft but is prevented from rotating, a rotary abutment portion that is symmetrical about the axis of rotation of the rotary shaft and that is mounted on the displaceable abutment portion by means of a bearing suitable for transmitting axial forces to the displaceable abutment portion, a flexible device of great stiffness connecting the displaceable abutment portion to the case in such a manner as to enable the displaceable abutment portion to move in small-amplitude translation along the axis of the rotary shaft while transmitting said axial forces received by the displaceable abutment portion from said bearing to the case, an axial thrust transmission member for transmitting thrust from the rotary shaft to the rotary abutment portion, said thrust transmission member being symmetrical about the axis of the rotary shaft and being shaped in such a manner as to be in contact between the rotary shaft and the rotary abutment portion without exerting force thereon whenever the machine is at rest, and to drive the rotary abutment portion by purely static friction when the machine is rotating and is exerting axial thrust, and means for applying a control fluid in contact with said flexible device in such a manner that the pressure of the fluid exerts a force on said flexible device tending to move the displaceable abutment portion, the rotary abutment portion, and, where appropriate, the thrust transmission member away from the shaft whenever the pressure of the fluid conveyed by the machine at said given point exceeds a value $(1+E)$ PL which is very slightly greater than said pressure value PL.

By implementing a rotary abutment portion to which the thrust transmission member is fixed, friction is reduced to a minimum, particularly when the shaft is supported by radial bearings that are independent during all stages of operation. The presence of a flexible membrane device fixed to the case further reduces friction and makes it easy to adjust stiffness by construction, thereby making it possible to obtain accurate forces. The axial abutment system is simple to design and to make and it consumes very little power, thus having an entirely negligible effect on the efficiency of the machine. The axial displacement of the shaft is very small and the axial abutment system has no effect on determining the axial clearances for the rotor assembly. It is easy to adjust, abutment separation being obtained on the desired pressure by acting on the thickness of the flexible membrane, on the area of the membrane that is exposed to the control fluid, on the nature of the material used for the membrane, and possibly on the pressure of the fluid.

In a first possible embodiment, the means for applying a control fluid comprise means for applying the pressure of the fluid conveyed by the machine to the flexible device via the inside of the machine. This pressure may be taken from various different points of the machine.

When using a multicellular centrifugal pump, the pressure of the fluid conveyed by the machine for application to the flexible device may be taken from the outlet of one of the stages, for example.

The embodiment described above has the advantage of simplicity given that there are no external members. It may also be observed that the flexible device is controlled without consuming any flow.

In another possible embodiment, the means for applying a control fluid comprise a tube outside the machine connected between a tapping point for obtaining the pressure of the fluid conveyed by the machine and a point for applying the pressure of said control fluid, which point is situated in the vicinity of the flexible device, a sealing ring being interposed between the case and the portion of the shaft that co-operates with the axial abutment system. This embodiment makes it possible to isolate the flexible device completely from the remainder of the machine while nevertheless using a control pressure that is directly linked to the operation of the machine.

The pressure acting on the flexible device may be adjusted by means of an expander (a pressure reducer) interposed between the source of control fluid and the inside wall of the flexible device.

In some applications, the control fluid need not be the fluid conveyed by the rotary machine, but may be a different fluid coming from a regulation system. In such a case, the means for applying a control fluid comprise a tube outside the machine connected between a tapping point for tapping a fluid under pressure from a regulator system, which fluid is distinct from the fluid conveyed by the machine, and an injection point for injecting said control fluid and situated in the vicinity of the flexible device, a sealing ring being interposed between the case and the portion of the rotary shaft that co-operates with the axial abutment system, and a pressure sensor being disposed in the machine to act via said regulator system to open a valve enabling the control fluid to exert its pressure at said injection point.

According to the invention, it is also possible to use a fluid having a control pressure that is greater than the pressure required for acting on the flexible device. In such a case, the means for applying a control fluid comprise a first device for applying a first control fluid to the inside face of the flexible device directed towards the thrust transmission member, and a second device for applying a second control fluid to the outside face of the flexible device directed towards the case, one of the first and second control fluids preferably being constituted by the fluid conveyed by the machine.

The flexible device may be fixed removably or permanently on the frame or the case of the machine.

When it is fixed removably thereon, the flexible device applied to the frame of the machine may also act as a case that is screwed or clamped onto the frame.

In particular, the flexible device may be constituted by a bellows, by a corrugated membrane, by a plane membrane having parallel faces, e.g. constituted by a metal plate, or else by a membrane that is essentially hemispherical.

In another particular embodiment, the rotary machine further comprises a rest limiting the scope of the displaceable abutment portion as it moves away from the rotary shaft under the effect of the control pressure. This makes it possible to reduce the stiffness of the resilient device for the purpose of adapting it to the available pressure or of reducing its size.

The bearing disposed between the axially displaceable abutment portion and the rotary abutment portion may be implemented in various different ways, but it may comprise, in particular, two oppositely-directed angular contact ball bearings mounted to eliminate any axial play between the rotary abutment portion and the abutment portion that is moveable in translation. This makes it possible to increase axial tolerances and to eliminate any danger of further contact between the shaft and the thrust transmission member after they have separated.

The thrust transmission member may be fixed to the rotary abutment portion and it may comprise a crimped ball cooperating with the end of the rotary shaft or a cylindrical component delimited by two planes perpendicular to its axis and fitted into the rotary abutment portion, or else a cylindrical component fitted axially into the rotary abutment portion and delimited by a lip-forming toroidal portion where it comes into contact with the end of the rotary shaft.

In yet another particular embodiment, the thrust transmission member fixed to the rotary abutment portion comprises a ring which is coaxial with the rotary shaft and which, when the machine is at rest, comes into contact with a shoulder or a ring fixed to the rotary shaft, and the rotary shaft passes through the entire automatically-retracting axial abutment system.

However, the thrust transmission member may also be fixed to the end of the rotary shaft, in which case it may co-operate with the end of the rotary abutment portion. In this case the thrust transmission member may comprise a ball or a cylindrical component, for example, in the same way as when mounted on the rotary abutment portion.

BRIEF DESCRIPTION OF THE DRAWINGS

Other characteristics and advantages of the invention appear from the following detailed description of particular embodiments given by way of example and made with reference to the accompanying drawings, in which.

DETAILED DESCRIPTION OF PARTICULAR EMBODIMENTS

Figure 1A:
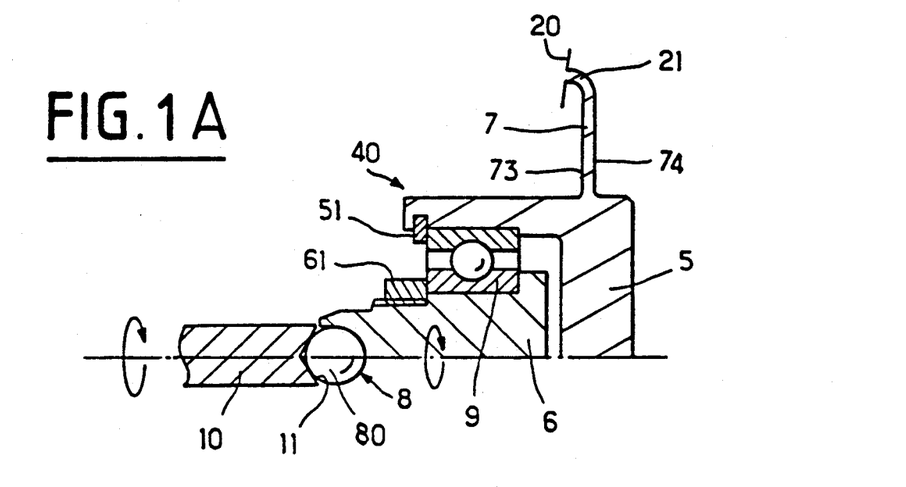
FIGS. 1A and 1B are axial half-section views of a first embodiment of an automatically-retracting axial abutment system of the invention in which the abutment comprises a plane flexible membrane, the figures showing the system respectively during a starting stage and under steady running conditions.
Figure 1B:
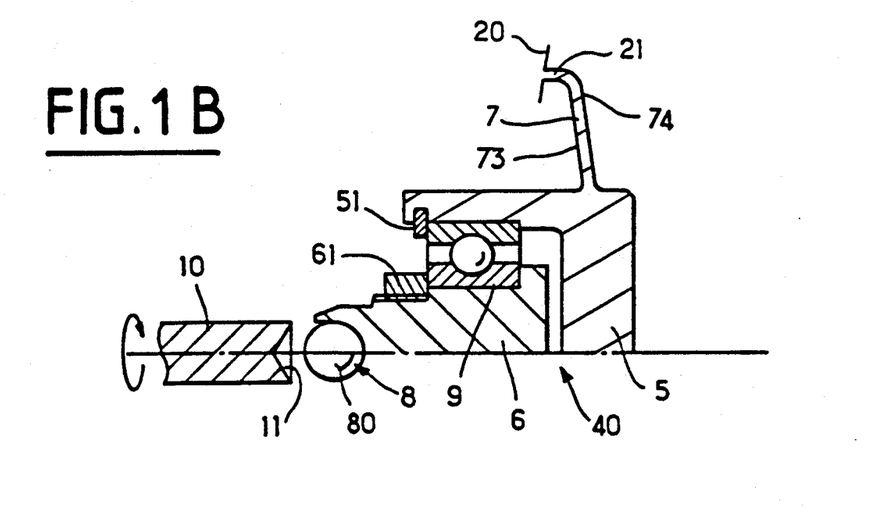

FIGS. 1A and 1B show one embodiment of an axial abutment system 40 of the invention for installing in a rotary machine interposed on a fluid circuit and being either a driving machine such as a centrifuge pump, or a driven machine, or a combination of both such as a turbopump. In FIGS. 1A and 1B only the rotary shaft 10, the frame 20, and the case 21 are shown in part and symbolically to represent the main components of the rotary machine with which the axial abutment system 40 co-operates, which system is intended to counterbalance the axial thrust exerted by the shaft 10 during starting and stopping stages, the system retracting when the speed of rotation of the shaft 10 and thus the pressure of its working fluid reach full-speed values.

In FIGS. 1A and 1B, the axial abutment 40 comprises an axially displaceable abutment 5 which is connected to the case 21 of the machine by a very stiff flexible device 7. A rotary abutment portion 6 is mounted via a bearing 9 on the displaceable abutment portion 5. The abutment portions 5 and 6 are circularly symmetrical about the axis of rotation of the shaft 10.

Figure 8:
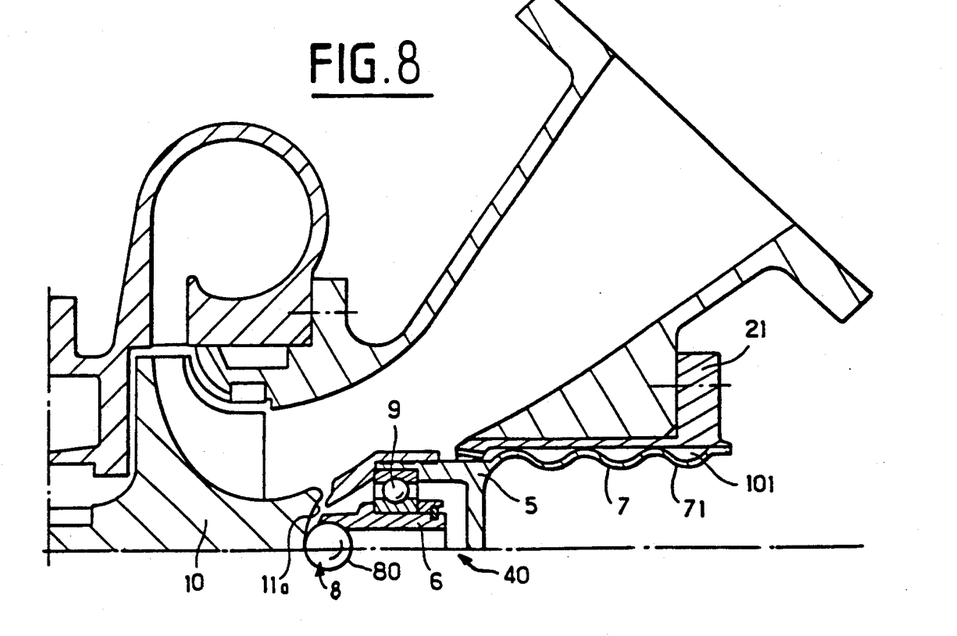
Figure 10:
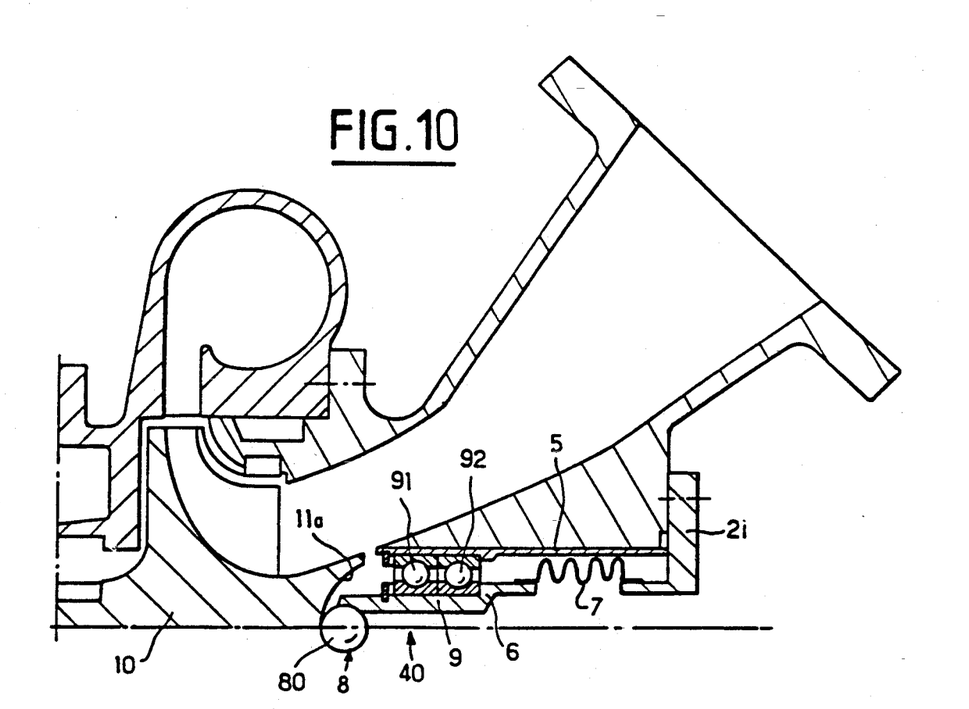
FIG. 10 is an axial half-section view of a portion of a rotary machine conveying a fluid and incorporating an axial abutment system of the embodiment shown in FIG. 9.

An axial thrust transmission member 8 constituted in FIGS. 1A and 1B by a ball 80 is applied to the end of the rotary abutment portion 6 that is distant from the displaceable abutment portion 5 and co-operates with the end of the rotary shaft 10 which has a bearing surface 11 that may, for example, be conical (FIGS. 1A and 1B) or hemispherical (bearing surface 11a in FIGS. 8 and 10). The axial thrust transmission member 8 serves during starting and stopping (FIG. 1A) to provide contact between the rotary portion 6 of the abutment 40 and the end of the rotary shaft 11.

The bearing 9 may be constituted by a ball bearing having its cages held in position on the displaceable portion 5 and on the rotary portion 6 respectively of the axial abutment 40 by means of respective retaining pieces 51 and 61. The bearing 9 serves both to provide a connection between the rotary portion 6 and the displaceable portion 5, and to transmit the axial force exerted by the shaft 10.

The flexible device 7 which may be constituted by a plane metal membrane 70 having parallel faces, being of constant predetermined thickness and having great stiffness, enables the abutment assembly constituted by the portions 5 and 6 together with the ball 80 to move a small distance longitudinally to the right under steady conditions (FIG. 1B) under the action of a higher pressure acting on the front inside face 73 of the membrane 70 compared with a lower pressure exerted on the rear outside face 74 of the membrane 70.

The axial abutment system 40 operates as follows:

Before the system is started, the end of the machine shaft 11 is in contact with the thrust transmission member 8 (rest stage).

During the first portion of the starting-up stage (FIG. 1A), the residual longitudinal thrust is directed to press against the contact between the end of the shaft 11 and the ball 80, and by means of purely static friction to transmit said force via the rotary portion 6 and the bearing 9.

The force is transmitted to the case 21 of the machine via the portion 5 and the flexible device 7.

Since the flexible device 7 is very stiff, the force received by the system at the contact between the bearing surface 11 and the ball 80 gives rise to negligible displacement.

The inside face 73 of the flexible device 7 is subjected to the pressure in the operating fluid circuit. This pressure transmits a force to the assembly which is a function of the pressure and is generally directly associated with the speed of rotation, and the force displaces the assembly 8, 6 and 5 to the right in translation when the fluid pressure exceeds a predetermined value $(1+E)P_L$ which is less than the pressure $P_R$ corresponding to the operating speed but very slightly greater than the pressure $P_L$ at which the axial thrust disappears. Contact between the shaft 10 and the thrust transmission member 8 is thus broken and the speed of rotation of the rotary portion 6 drops rapidly.

The position of the rotor assembly 10 is then defined by the dynamic balancing system which moves the moving assembly very slightly to the left in translation.

Proper operation of such a system relies on knowing three parameters:

the percentage of the nominal pressure $P_R$ at which the balancing system becomes effective;

the value and the direction of the force during the starting transient; and the amount of play available to the dynamic balancing system.

Knowledge of these three parameters makes it possible to dimension:

the rotary abutment portion 6; and the flexible device 7 to which the displaceable abutment portion 5 is connected, for which the following are determined:

the stiffness of the membrane 70 and the value of the displacement necessary; and the value of the pressure applied to the face 73, with the face 74 being in the atmosphere or optionally being subjected to applied counter pressure.

Figure 2A:
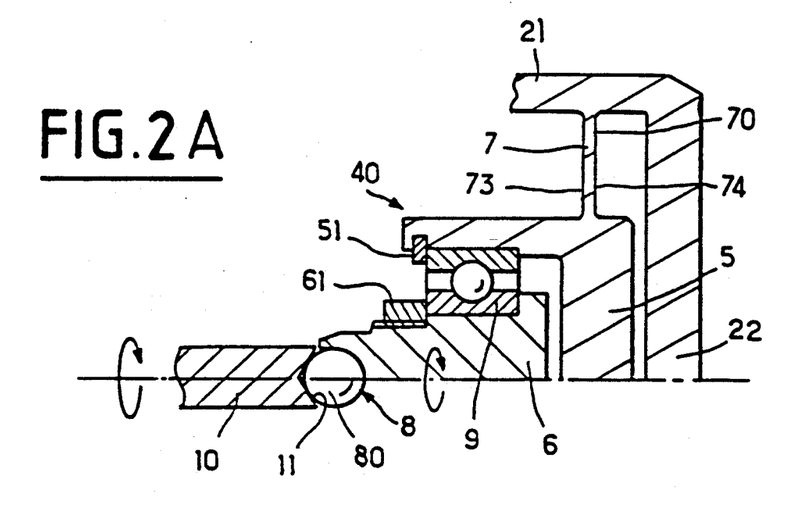
FIGS. 2A and 2B are axial half-section views of a variant embodiment of an automatically-retracting axial abutment system of the invention in which an additional fixed abutment is provided behind the automatically-retracting abutment.
Figure 2B:
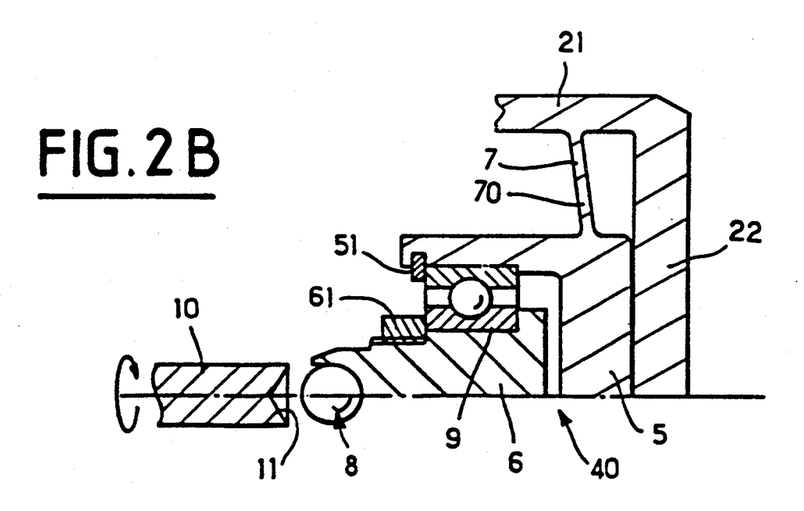

FIGS. 2A and 2B show an automatically-retracting axial abutment system 40 which is similar to that of FIGS. 1A and 1B, but which further includes an additional rest 22 fixed to the cage 21.

The additional rest 22 is essentially disposed in a plane perpendicular to the axis of the machine and on the side of the axial abutment 40 that is furthest from the shaft 10. The additional rest 22 ensures that all of the components 5 to 9 of the abutment 40 are in a known position when the assembly is running under steady conditions, thereby making it possible to use a membrane 70 of lower stiffness or a pressure of higher value.

It may be observed that the axial abutment system of the invention requires only a very small amount of axial displacement for the shaft. The axial abutment system has no effect in determining the set of axial clearances for the rotor assembly.

The design of the axial abutment is simple and manufacture only requires techniques that are common in precision industry (casting, welding, machining).

The axial abutment operates only during short periods of time and causes only a small amount of energy to be consumed which has a completely negligible influence on the efficiency of the machine.

It is easy to adjust separation of the abutment 40 on the desired pressure $(1+E)P_L$ by acting on the thickness of the flexible membrane 70, on the area thereof which is exposed to the control fluid, and optionally the pressure of said fluid or the counterpressure exerted on the outside face 74 of the membrane 70.

Figure 3:
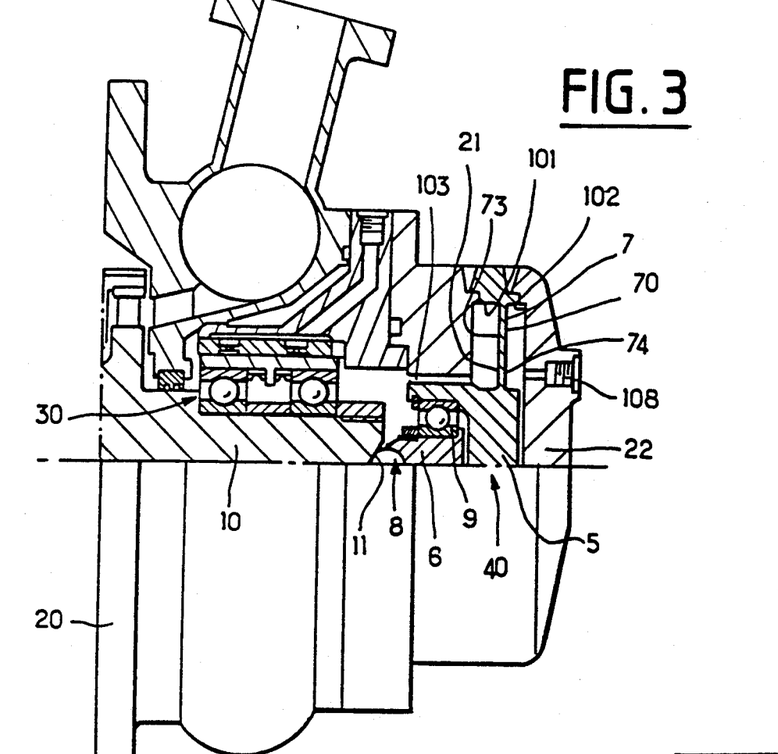
FIG. 3 is an axial half-section view of the end of a rotary machine conveying a fluid in which a particular embodiment of an automatically-retracting axial abutment is installed that makes use directly of the fluid pressure available inside the machine.

FIG. 3 shows one end of a rotary machine comprising a rotary shaft 10 mounted by radial bearings 30 on a frame 20 and co-operating with an axial abutment 40 such as that described with reference to FIGS. 2A and 2B.

A tapping point 108 for connection to a source of fluid under pressure is disposed in the additional rest face 22 constituting the end case of the machine and is in communication with a chamber 102 defined by the case 21, 22 of the machine and the outside face 74 of the membrane 70. The connection point 108 thus enables a counterpressure to be applied to the membrane 70 or merely enables it to be connected to the pressure of the surrounding air if the point 108 is neither closed nor connected to a source of fluid under pressure.

The chamber 101 defined by the case 21 and the inside face 73 of the membrane 70 is fed directly from the fluid conveyed by the machine via an annular space or via one or more ducts 103 situated inside the machine. This embodiment has the advantage of simplicity and requires no members outside the machine.

Figure 4:
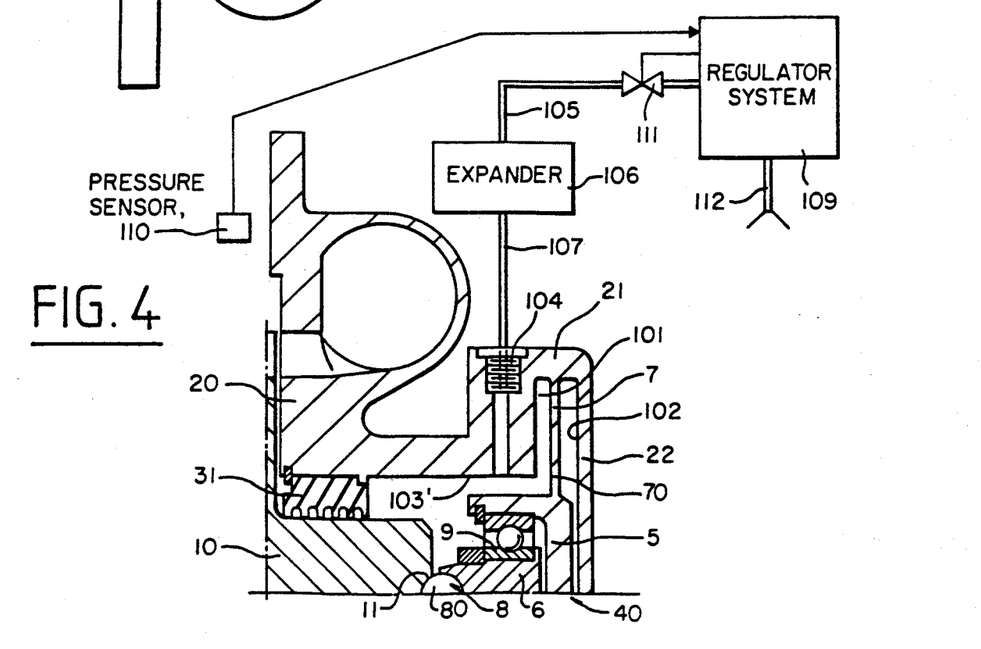
FIG. 4 is an axial half-section view of the end of a rotary machine conveying a fluid in which a particular embodiment of an automatically-retracting axial abutment is installed that makes use of the pressure of a fluid applied via a duct external to the machine.

FIG. 4 shows another embodiment in which a sealing ring 31 is interposed between the end of the shaft 10 situated close to the axial abutment 40 and the case 21 of the machine. A point 104 for injecting a control fluid is connected to an external control fluid feed tube 107 and opens out via a duct 103' into the space 101 situated in the vicinity of the flexible membrane 70, between the sealing ring 31 and the inside face of the membrane 70. The external tube 107 is connected, where applicable via an expander (pressure reducer) 106, to a source 105 of control fluid. In this case, the control fluid may be constituted by the fluid conveyed by the machine and may come from a tapping point on the machine itself, or alternatively it may be constituted by a separate fluid coming from a regulator system 109 which is itself fed from an external source 112 of fluid under pressure. A pressure sensor 110 disposed inside the machine acts via the regulator system 109 to open a valve 111 enabling the control fluid to exert its pressure at the injection point 104.

FIGS. 1A, 1B, 2A, 2B, 3 and 4 show a resilient device 7 comprising a flexible membrane 70 mounted permanently on the frame 20 of the machine, e.g. by being welded to the frame 20.

Figure 5:
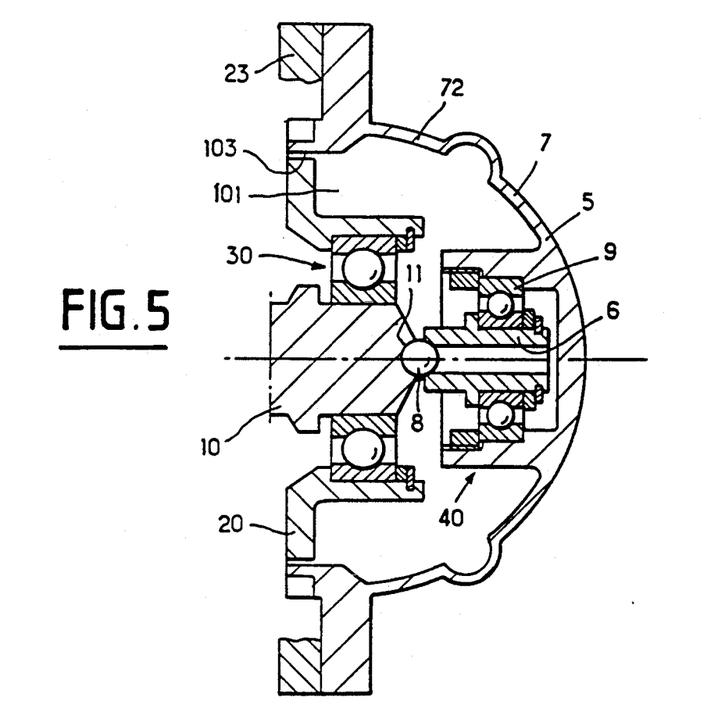
FIG. 5 is an axial section view of the end of a rotary machine conveying a fluid in which a particular embodiment of an automatically-retracting axial abutment of the invention is installed in which the axial abutment comprises a removeable membrane constituting a portion of the case of the machine.

FIG. 5 shows a resilient device 7 that is removable and which acts as the case, said device being fixed to a flange 23 of the frame. In FIG. 5, the resilient device comprises a flexible membrane 72 which is advantageously convex in shape, e.g. being substantially hemispherical, and it defines a housing containing the rotary portion 6 of the abutment 40. This embodiment makes it easy to adjust the axial abutment system. The chamber 101 situated between the frame 20 and the membrane 72 may be fed internally via passages 103 with the fluid conveyed by the rotary machine as in the embodiment of FIG. 3, however it may alternatively be fed via a coupling point to an external tube as shown in FIG. 4.

FIGS. 6, 7, 8, 10, and 11 show embodiments in which the flexible device 7 does not comprise a plane or convex membrane, but comprises a bellows 71 whose shape is adapted to the configuration of the machine. The shape and the geometrical characteristics of the flexible device 7 are generally defined as a function of the speed of rotation of the shaft 10 and of the pressure levels of the control fluid, and also as a function of the shapes and the dimensions of the rotary machine.

Figure 6:
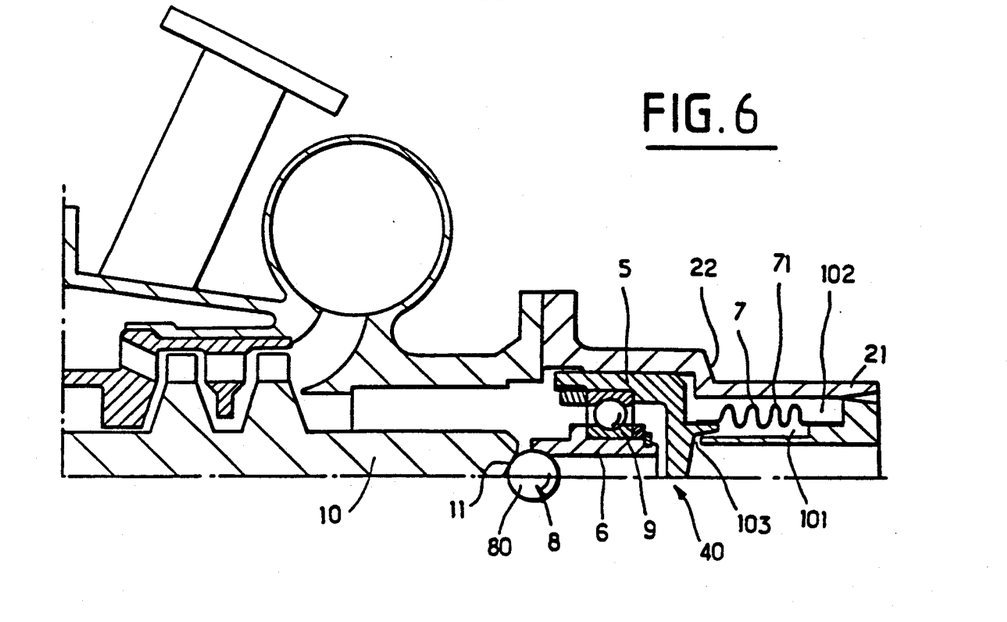
FIG. 6 is an axial half-section view of the end of a rotary machine conveying a fluid in which an automatically-retracting axial abutment system of the invention having a bellows-type membrane is installed.

FIG. 6 shows a shoulder on the case 21 constituting an additional rest surface 22 limiting the stroke of the displaceable abutment portion 5. The control fluid is applied via an inlet 103 to the chamber delimited by the inside face of the bellows 71 and a portion of the case 21.

Figure 7:
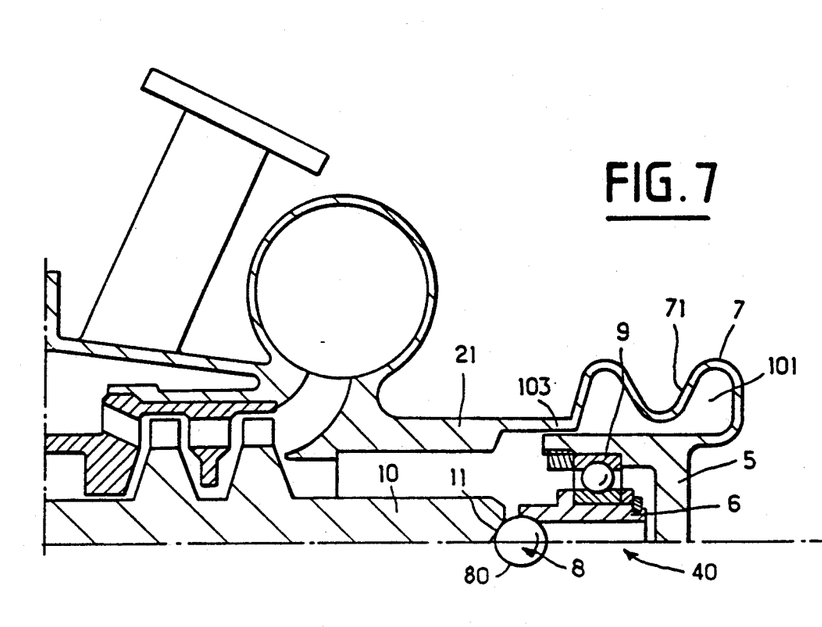
FIGS. 7 and 8 are axial half-section views of various embodiments of a rotary machine conveying a fluid in which the bellows-type membrane of an automatically-retracting axial abutment of the invention constitutes a portion of the case of the machine.

In FIGS. 7, 8, and 10, the bellows 71 itself constitutes a portion of the case 21.

The bearing 9 providing the connection between the rotary abutment portion 6 and the displaceable abutment portion 5, and also transmitting axial force therebetween may be constituted for example by a ball bearing, by a bearing having conical rollers, by a ball abutment, or by a controlled hydrodynamic abutment.

Figure 9:
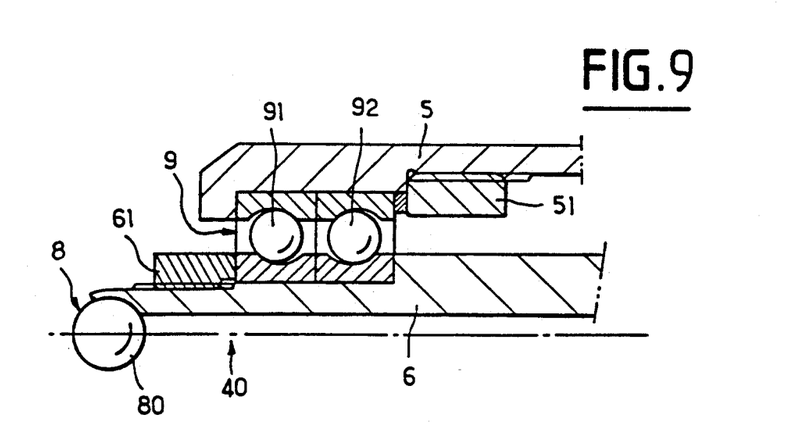
FIG. 9 is a detailed view in axial half-section showing an automatically-retracting axial abutment system including a bearing with two angular contact ball bearings.

In a particular embodiment shown in FIGS. 9 and 10, the bearing 9 may be constituted by a set of two oppositely-mounted angular contact ball bearings 91 and 92 serving to eliminate axial play between the abutment portions 5 and 6. This serves to prevent any risk of further contact between the bearing surface 11A and the thrust transmission member 8 after they have separated (FIG. 10), thereby making it possible to increase axial tolerances.

Figure 12:
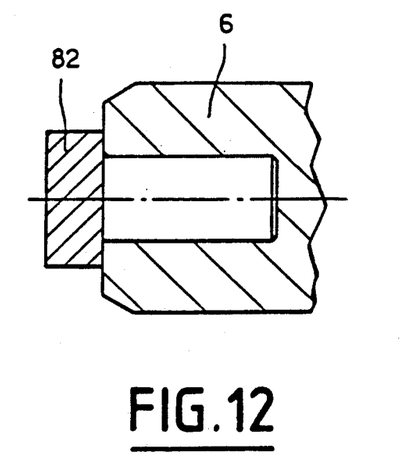
FIGS. 12 and 13 are axial sections through a portion of an automatically-retracting axial abutment system showing two variant embodiments that use an axial thrust transmission member of the cylindrical type.

The thrust transmission member 8 fixed to the rotary abutment portion 6 may be constituted by a crimped ball as shown in FIGS. 1A, 1B, 2A, 2B, and 3 to 10. Nevertheless, the thrust transmission member 8 could be different in shape. Thus, FIG. 12 shows a thrust transmission member constituted by a cylindrical component 82 lying on the axis of the rotary abutment portion 6 and fitted axially therein, with the cylindrical component 82 being delimited by two planes perpendicular to its own axis.

Figure 13:
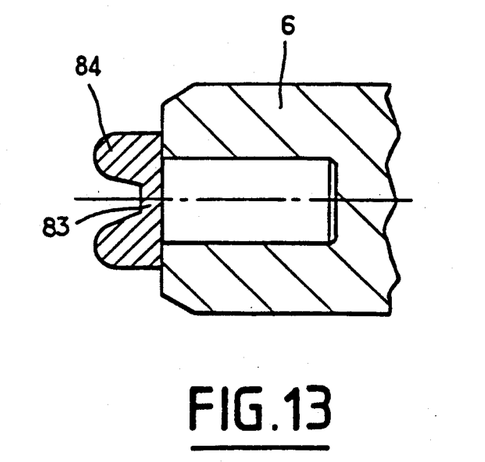

FIG. 13 shows a variant embodiment in which the thrust transmission member 8 fixed to the rotary abutment portion 6 comprises a cylindrical component 83 received axially in the rotary abutment portion 6 and delimited by a toroidal portion forming a kind of lip 84 where it comes into contact with the end of the rotary shaft 10.

In the embodiments of FIGS. 1A, 1B, 2A, 2B, 3 to 10, 12, and 13, the automatically-retractable axial abutment system 40 has a thrust transmission member which, regardless of whether it is spherical, cylindrical, toroidal, or some other shape, e.g. conical, always co-operates with a bearing surface, e.g. a surface that is hemispherical, plane, or conical, formed at the end of the rotary shaft 10.

Figure 11:
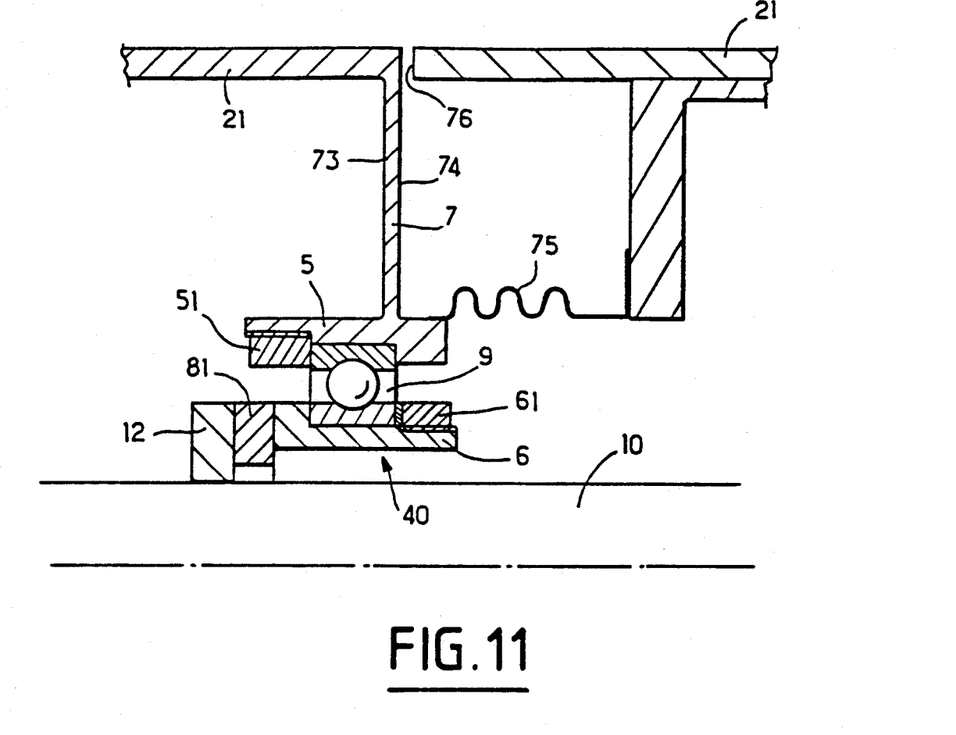
FIG. 11 is an axial half-section view of a portion of a rotary machine conveying a fluid in which an automatically-retracting axial abutment system is installed with the shaft of the machine passing therethrough.

Nevertheless, the invention also applies in the same manner to an axial abutment system 40 having the rotary shaft 10 passing therethrough, as shown in FIG. 11.

Under such circumstances, the thrust transmission member fixed to the rotary abutment portion 6 comprises a ring 81 which is coaxial with the rotary shaft 10 and which comes into contact when the machine is at rest with a shoulder or ring 12 fixed to the rotary shaft 10. Under such circumstances, an additional sealing bellows or membrane 75 is required between the periphery of the flexible device 7 and the case 21. FIG. 11 shows a flexible device 7 constituted by a plane membrane 7 having one face 73 subjected to the pressure of a control fluid constituted by the fluid conveyed by the machine, and a face 74 which is in contact with ambient air via an opening 76. The bellows 75 provides sealing between the displaceable abutment portion 5 connected to the face 74 of the membrane 7 and the case 21. Other configurations are naturally possible.

The automatically-retracting axial abutment systems described above are particularly adapted to rotary machines for use in space. By way of example, mention may be made of a turbopump having a speed of rotation of 35,000 revolutions per minute (rpm), operating at a power of 12 MW, having a mass of 260 kg, and whose efficiency is 0.76.

Among the advantages of automatically-retracting axial abutment systems of the invention, it may be observed that there is no friction at the resilient device 7, or at the thrust transmission member 8, and the stiffness of the flexible membrane is easily adjusted by construction since its thickness and its area may be selected to lie anywhere within very large ranges of possible values. For a given turbo machine, the nature of the material used for the flexible membrane also makes it easy to adapt the characteristics of the axial abutment device to very different axial thrusts. The automatically-retracting axial abutment system can easily be assembled and disassembled insofar as such assembly and disassembly do not interfere with the system of axial design dimensions to be achieved in the rotary machine. Finally, the axial abutment system does not reduce the efficiency of the machine in any way.

It may be observed that for rotary machines conveying a fluid, such as centrifugal pumps for example, the invention is applicable regardless of the particular type or characteristics of the pump.

In all cases, the following inequality is satisfied:

$$TM < A1.PM \quad (1)$$

where:

TM is the maximum axial thrust on the pump under nominal conditions;

A1 is the area of a circle whose diameter is the same as the diameter of the impeller sealing ring; and PM is the delivery pressure at the outlet from the pump, and thus the maximum pressure that is to be encountered in the pump.

In accordance with the principle on which the invention is based, the membrane must retract when axial thrust TL is reached such that TL is substantially less than TM.

The following inequalities can thus be written:

$$TL < < TM \quad (2)$$

$$TL < < A1.PM \quad (3)$$

Under all circumstances, these inequalities can be satisfied by constructing a resilient membrane having the same diameter as the impeller sealing ring, even though other diameters could alternatively be selected, and then subjecting said membrane to a pressure PL that is equal to or less than PM.

It is possible to give the membrane a satisfactory deformation-stress characteristic given the various operating modes of pumps, in particular by ensuring that it deflects by an amount lying in the range about 50 micrometers to about 500 micrometers when the pressure PL is slightly exceeded.

Examples adapted to the turbopumps of rocket engines operating at a control pressure PL=50 bars may have membranes of thickness lying between about 1 mm and about 5 mm and satisfying the following characteristics:

| Membrane Diameter | Total membrane Deflection | Membrane Stiffness | Axial thrust PL taken up by the abutment |
|---|---|---|---|
| 50 mm | 0.10 mm | 15,000 daN/mm | 700 daN |
| 100 mm | 0.16 mm | 25,000 daN/mm | 2,000 daN | thickness in the range 1 mm to 5 mm

As already mentioned above, the resilient device 7 of the invention may be constituted by a bellows having one or more corrugations.

Under such circumstances, the stiffness per corrugation Cal may lie in the range a few hundred to a few thousand daN per millimeter.

If necessary, the total thickness can be reduced by increasing the number of corrugations Z.

The overall stiffness is given by the ratio Cal/Z.

Plane membranes which enable a high degree of stiffness to be obtained are preferably used for assemblies having small clearance whereas bellows make it possible to define a resilient device that is flexible.

It may also be observed that the balancing plate of a rotary machine conveying a fluid is generally designed in such a manner that during starting the shaft is in contact with the abutment and the axial force of the shaft is exerted in a well-determined axial direction.

Should the direction of the axial force exerted by the shaft vary during starting or during stopping, it is possible to dispose an automatically-retracting axial abutment system at each end of the shaft in such a manner as to enable axial force to be taken up in both possible displacement directions of the shaft.

It should be observed that installing one or two automatically-retracting axial abutment systems has no effect in determining the axial clearances that are provided by construction in a rotary machine, given that these clearances are determined essentially by the stroke of the balancing plate and that the balancing plate is implemented conventionally.

When installing two automatically-retracting axial abutment systems, at respective ends of the same machine, both systems may be of the same type, e.g. having flexible membranes subjected to the pressure of a fluid as in the present invention. However, in order to facilitate adjusting both systems, it is possible to install two automatically-retracting axial abutment systems that are controlled by different parameters. Thus the automatically-retracting axial abutment system at one of the ends of the machine may be of the type having a flexible membrane subjected to pressure as in the present invention, while the automatically-retracting axial abutment system at the other end of the machine may be of another type.

We claim:

1. A rotary machine conveying a fluid, the machine comprising a rotary shaft mounted via radial bearings to a frame inside a case, and the shaft delivering axial thrust in a predetermined direction during the transient stages of starting and stopping, the pressure PR of the fluid at full speed at a given point in the machine being greater than the pressure value PL at which axial thrust disappears at the end of the transient starting stage or before the beginning of the transient stopping stage, wherein the machine further comprises an automatically-retracting axial abutment system mounted between its rotary shaft and its case, said automatically-retracting axial abutment system comprising:
- a displaceable abutment portion that is symmetrical about the axis of rotation of the rotary shaft but is prevented from rotating;
- a rotary abutment portion that is symmetrical about the axis of rotation of the rotary shaft and that is mounted on the displaceable abutment portion by means of a bearing suitable for transmitting axial forces to the displaceable abutment portion;
- a flexible device of great stiffness connecting the displaceable abutment portion to the case in such a manner as to enable the displaceable abutment portion to move in small-amplitude translation along the axis of the rotary shaft while transmitting the said axial forces received by the displaceable abutment portion from said bearing to the case;
- an axial thrust transmission member for transmitting thrust from the rotary shaft to the rotary abutment portion, said thrust transmission member being symmetrical about the axis of the rotary shaft and being shaped in such a manner as to be in contact between the rotary shaft and the rotary abutment portion without exerting force thereon whenever the machine is at rest, and to drive the rotary abutment portion by purely static friction when the machine is rotating and is exerting axial thrust; and
- means for applying a control fluid in contact with said flexible device in such a manner that the pressure of the fluid exerts a force on said flexible device tending to move the displaceable abutment portion, the rotary abutment portion, and, where appropriate, the thrust transmission member away from the shaft whenever the pressure of the fluid conveyed by the machine at said given point exceeds a value $(1+E)PL$ which is very slightly greater than said pressure value PL.

2. A rotary machine according to claim 1, wherein the means for applying a control fluid comprise means for applying the pressure of the fluid conveyed by the machine to the flexible device via the inside of the machine.

3. A rotary machine according to claim 1, wherein the means for applying a control fluid comprise a tube outside the machine connected between a tapping point for obtaining the pressure of the fluid conveyed by the machine and a point for applying the pressure of said control fluid, which point is situated in the vicinity of the flexible device, a sealing ring being interposed between the case and the portion of the shaft that co-operates with the axial abutment system.

4. A rotary machine according to claim 1, wherein the means for applying a control fluid include an expander interposed between the source of the control fluid and the wall of the flexible device.

5. A rotary machine according to claim 1, wherein the means for applying a control fluid comprise a tube outside the machine connected between a tapping point for tapping a fluid under pressure from a regulator system, which fluid is distinct from the fluid conveyed by the machine, and an injection point for injecting said control fluid and situated in the vicinity of the flexible device, a sealing ring being interposed between the case and the portion of the rotary shaft that co-operates with the axial abutment system, and a pressure sensor being disposed in the machine to act via said regulator system to open a valve enabling the control fluid to exert its pressure at said injection point.

6. A rotary machine according to claim 1, wherein the means for applying a control fluid comprise a first device for applying a first control fluid to the inside face of the flexible device directed towards the thrust transmission member, and a second device for applying a second control fluid to the outside face of the flexible device directed towards the case.

7. A rotary machine according to claim 6, wherein one of the first and second control fluids is constituted by the fluid conveyed by the machine.

8. A rotary machine according to claim 1, wherein the flexible device comprises a plane metal plate having parallel faces.

9. A rotary machine according to claim 1, wherein the flexible device comprises a component that is fixed permanently to the frame of the machine.

10. A rotary machine according to claim 1, wherein the flexible device comprises a removeable component connected to the frame of the machine.

11. A rotary machine according to claim 10, wherein said removeable component connected to the frame of the machine also acts as a case that is screwed or clamped to the frame.

12. A rotary machine according to claim 1, wherein the flexible device comprises a bellows.

13. A rotary machine according to claim 1, further comprising a rest limiting the scope of the displaceable abutment portion as it moves away from the rotary shaft under the effect of the control pressure.

14. A rotary machine according to claim 1, wherein the thrust transmission member is fixed to the rotary abutment portion and comprises a crimped ball co-operating with the end of the rotary shaft.

15. A rotary machine according to claim 1, wherein the thrust transmission member is fixed to the rotary abutment portion and comprises a cylindrical component delimited by two planes perpendicular to its axis and received in the rotary abutment portion.

16. A rotary machine according to claim 1, wherein the thrust transmission member is fixed to the rotary abutment portion and comprises a cylindrical component received axially in the rotary abutment portion and delimited by a toroidal portion forming a lip in the portion of the thrust member that comes into contact with the end of the rotary shaft.

17. A rotary machine according to claim 1, wherein the rotary abutment portion is mounted relative to the displaceable abutment portion by means of two oppositely-mounted angular contact ball bearings, thereby eliminating any axial play between the rotary abutment portion and the displaceable abutment portion.

18. A rotary machine according to claim 1, wherein the thrust transmission member is fixed to the rotary abutment portion and comprises a ring which is coaxial with the rotary shaft and which, when the machine is at rest, comes into contact with a shoulder or a ring fixed to the rotary shaft, and wherein the rotary shaft passes through the entire automatically-retracting axial abutment system.

19. A rotary machine according to claim 1, wherein the thrust transmission member is fixed to the end of the rotary abutment portion.

* * * * *

UNITED STATES PATENT AND TRADEMARK OFFICE
CERTIFICATE OF CORRECTION

PATENT NO. : 5,232,334
DATED : August 3, 1993
INVENTOR(S) : Claude Mechin, et al It is certified that error appears in the above-indentified patent and that said Letters Patent is hereby corrected as shown below:

Column 6, line 57, "a portion" should read —the end—.

Column 10, line 38, "member 8 fixed" should read —member fixed—.

Signed and Sealed this

Fifth Day of July, 1994

*Attest:*

BRUCE LEHMAN

*Attesting Officer*     Commissioner of Patents and Trademarks